(12) United States Patent
Barton et al.

(10) Patent No.: US 9,816,207 B2
(45) Date of Patent: Nov. 14, 2017

(54) TWO-STEP SULFONATION PROCESS FOR THE CONVERSION OF POLYMER FIBERS TO CARBON FIBERS

(71) Applicant: Dow Global Technologies LLC, Midland, MI (US)

(72) Inventors: Bryan E. Barton, Midland, MI (US); Jasson T. Patton, Midland, MI (US); Eric J. Hukkanen, Midland, MI (US); Mark T. Bernius, Bowling Green, OH (US)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 14/413,454

(22) PCT Filed: Jul. 3, 2013

(86) PCT No.: PCT/US2013/049192
§ 371 (c)(1),
(2) Date: Jan. 8, 2015

(87) PCT Pub. No.: WO2014/011460
PCT Pub. Date: Jan. 16, 2014

(65) Prior Publication Data
US 2015/0152574 A1  Jun. 4, 2015

Related U.S. Application Data

(60) Provisional application No. 61/670,821, filed on Jul. 12, 2012.

(51) Int. Cl.
| | | |
|---|---|---|
| C01B 31/02 | (2006.01) | |
| D01F 9/21 | (2006.01) | |
| C01B 32/05 | (2017.01) | |
| D01F 9/14 | (2006.01) | |
| D06M 11/55 | (2006.01) | |
| D01F 11/16 | (2006.01) | |
| D06M 101/20 | (2006.01) | |

(52) U.S. Cl.
CPC ............... *D01F 9/21* (2013.01); *C01B 32/05* (2017.08); *D01F 9/14* (2013.01); *D01F 11/16* (2013.01); *D06M 11/55* (2013.01); *D06M 2101/20* (2013.01)

(58) Field of Classification Search
CPC .................................. C01B 32/05; D01F 9/21
See application file for complete search history.

(56) References Cited

U.S. PATENT DOCUMENTS

| 4,070,446 A | 1/1978 | Horikiri et al. |
| 8,500,960 B2 | 8/2013 | Ehrenberg et al. |

FOREIGN PATENT DOCUMENTS

WO     9203601 A2    3/1992

OTHER PUBLICATIONS

Pennings, et al. Amorphous carbon fibres from linear low density polyethylene. Journal of Materials Science. Oct. 1990, vol. 25, Issue 10, p. 4216-4222.
Pennings, et al. The effect of diameter on the mechanical properties of amorphous carbon fibres from linear low density polyethylene. Polymer Bulletin. Mar. 199, vol. 25, Issue 3, p. 405-412.
Ravi, V.A. Processing and Fabrication of Advanced Materials for High Temperature Applications II: Proceedings of a Symposium Sponsored by the Structural Material (No. 2). Jul. 1, 1993 pp. 475-485.
Zhang, et al. Carbon Fibers from Polyethylene-Based Precursors. Materials and Manufacturing Processes. 1994. vol. 9, Issue 2, pp. 221-235.
Leon y Leon. International SAMPE Technical Conference Series. 2002, vol. 34, pp. 506-519.
Karacan, et al. Use of sulfonation procedure for the development of thermally stabilized isotactic polypropylene fibers prior to carbonization. Journal of Applied Polymer Science. vol. 123, Issue 1, pp. 234-245.

*Primary Examiner* — Stuart Hendrickson

(57) ABSTRACT

Disclosed herein are processes for preparing carbon fibers, comprising: sulfonating a polymer fiber with a sulfonating agent that is fuming sulfuric acid, sulfuric acid, chlorosulfonic acid, or a combination thereof; treating the sulfonated polymer with a heated solvent, wherein the temperature of the heated solvent is at least 95° C.; and carbonizing the resulting product by heating it to a temperature of 501-3000° C. Carbon fibers prepared according to these methods are also disclosed herein.

19 Claims, 3 Drawing Sheets

Figure 1

| Example | Polymer | Sulfonation Conditions | Hot Solvent treatment | Carbonization Stress (MPa) | Carbon Fiber Properties at 1150 °C ||||
|---|---|---|---|---|---|---|---|---|
| | | | | | Diameter (microns) | Young's Modulus (GPa) | Tensile Strength (GPa) | Strain (%) |
| 1-Control | Ethylene/1-octene | 3 MPa 20% fuming sulfuric acid, 75 °C, 2.5 hrs, | None | 2 | 17.3 | 41.7 | 0.45 | 1.06 |
| 2 | Ethylene/1-octene | 7 MPa, 20% fuming sulfuric acid, 50 °C, 1 hr | 7 MPa, 96% H₂SO₄ for 2hr at 98 °C then 4hr at 120 °C | 2 | 12.9 | 68.4 | 1.08 | 1.57 |
| 3 | Ethylene/1-octene | 7 MPa, 20% fuming sulfuric acid, 50 °C, 1 hr | 3.5 MPa, 96% H₂SO₄ for 2hr at 98 °C then 4hr at 120 °C | 3 | 13.2 | 61.8 | 1.08 | 1.74 |
| 4 | Ethylene/1-octene | 7 MPa, 20% fuming sulfuric acid, 50 °C, 1 hr | 3 MPa, 96% H₂SO₄ for 2hr at 98 °C then 4hr at 120 °C | 2 | 12.5 | 65.2 | 1.05 | 1.60 |
| 5 | Ethylene/1-octene | 10 MPa, 20% fuming sulfuric acid, 50 °C, 1 hr | 3 MPa, 96% H₂SO₄ for 2hr at 98 °C then 4hr at 120 °C | 3.5 | 14.0 | 54.6 | 0.86 | 1.6 |
| 6 | Ethylene/1-octene | 6 MPa, 20% fuming sulfuric acid, 75 °C, 0.5 hr | 6 MPa, 96% H₂SO₄ for 16hr at 118 °C | 2 | 12.9 | 70.6 | 1.00 | 1.4 |
| 7 | Ethylene/1-butene | 18 MPa, 20% fuming sulfuric acid, 50 °C, 1 hr | 5 MPa, 96% H₂SO₄ for 1hr at 100 °C then 1hr at 120 °C | 15 | 15.7 | 64.2 | 0.96 | 1.5 |
| 8 | Ethylene/1-octene | 5 MPa, 20% fuming sulfuric acid, 50 °C, 1 hr | 18 MPa, 96% H₂SO₄ for 1hr at 100 °C then 1hr at 130 °C | 2.5 | 16.7 | 48.3 | 0.58 | 1.19 |
| 9 | Ethylene/1-octene | 5 MPa, 20% fuming sulfuric acid, 50 °C, 1 hr | 18 MPa, 96% H₂SO₄ for 1hr at 100 °C then 1hr at 160 °C | 2.5 | 17.0 | 47.8 | 0.85 | 1.78 |
| 10 | Ethylene/1-octene | 10.5 MPa, 6% fuming sulfuric acid, 90 °C, 15 min | 6 MPa, 1% fuming sulfuric acid for 15 min at 120 °C then 96% sulfuric acid for 15 min at 140 °C | 2.5 | 15.1 | 43.3 | 0.76 | 1.77 |
| 11 | Ethylene/1-octene | 18 MPa, 6% fuming sulfuric acid, 100 °C, 10 min | 11 MPa, 1% fuming sulfuric acid for 10 min at 120 °C then 96% sulfuric acid for 10 min at 140 °C | 2.8 | 10.9 | 60 | 1.08 | 1.80 |
| 15 | Ethylene/1-octene | 15.8 MPa, 6% fuming sulfuric acid, 110 °C, 10 min | 8.8 MPa, 1% fuming sulfuric acid for 10 min at 120 °C then 96% sulfuric acid for 10 min at 140 °C | 3.7 | 11.1 | 49 | 0.86 | 1.70 |
| 20 | Ethylene/1-octene | | | 3.5 | 10.6 | 54 | 0.77 | 1.38 |

TWO-STEP SULFONATION PROCESS FOR THE CONVERSION OF POLYMER FIBERS TO CARBON FIBERS

CROSS REFERENCE TO RELATED APPLICATIONS

This application is a 35 USC §371 national phase filing of PCT/US2013/049192 filed Jul. 3, 2013, which claims the benefit of U.S. Application No. 61/670,821, filed Jul. 12, 2012.

STATEMENT OF GOVERNMENT INTEREST

This invention was made under a NFE-10-02991 between The Dow Chemical Company and UT-Batelle, LLC, operating and management Contractor for the Oak Ridge National Laboratory operated for the United States Department of Energy. The Government has certain rights in this invention.

BACKGROUND OF THE INVENTION

The world production of carbon fiber in 2010 was 40 kilo metric tons (KMT) and is expected to grow to 150 KMT in 2020. Industrial-grade carbon fiber is forecasted to contribute greatly to this growth, wherein low cost is critical to applications. The traditional method for producing carbon fibers relies on polyacrylonitrile (PAN), which is solution-spun into fiber form, oxidized and carbonized. Approximately 50% of the cost is associated with the cost of the polymer itself and solution-spinning.

In an effort to produce low cost industrial grade carbon fibers, various groups studied alternative precursor polymers and methods of making the carbon fibers. Many of these efforts were directed towards the sulfonation of polyethylene and the conversion of the sulfonated polyethylene to carbon fiber. But the methods and resulting carbon fibers are inadequate for at least three reasons. First, the resulting carbon fibers suffer from inter-fiber bonding. Second, the resulting carbon fibers have physical properties that are inadequate. Thirdly, and most importantly, the sulfonation processes described utilize extended sulfonation times, typically on the order of several hours. For an economical process to be realized, rapid sulfonation technologies are needed; target sulfonation times should ideally be less than 1 hour.

For example, U.S. Pat. No. 4,070,446 described a process of sulfonating high density polyethylene using chlorosulfonic acid (Examples 1 and 2), sulfuric acid (Examples 3 and 4), or fuming sulfuric acid (Example 5). Example 5 in this patent used 25% fuming sulfuric acid at 60° C. for two hours to sulfonate high-density polyethylene (HDPE), which was then carbonized. When the inventors used this method to sulfonate linear low density polyethylene (LLDPE), the resulting fibers suffered from inter-fiber bonding, poor physical properties, and long sulfonation times. Consequently, this method was judged inadequate.

WO 92/03601 used a concentrated sulfuric acid method described in the U.S. Pat. No. 4,070,446 patent to convert ultra high molecular weight (UHMW) polyethylene fibers to carbon fibers. In Example 1 of this application, the polymer fibers (while under tension) were immersed in a 120° C., 98% sulfuric acid bath, the temperature of which was raised at a rate of 30° C. per hour to a maximum temperature of 180° C. (2 hour sulfonation). The sulfonated fibers were then washed with water, air-dried, and then (incompletely) carbonized at a temperature up to 900° C. Examples 2 and 3 in this application are prophetic and do not contain any data. The sulfonation times and batch process methods disclosed in this reference are inadequate.

In Materials and Manufacturing Processes Vol. 9, No. 2, 221-235, 1994, and in Processing and Fabrication of Advanced Materials for High Temperature Applications—II; Proceedings of a Symposium, 475-485, 1993; Zhang and Bhat reported a process for the sulfonation of ultra-high molecular weight (UHMW) polyethylene fibers using only sulfuric acid. Both papers report the same starting Spectra fibers and the same sulfonation process. The fibers were wrapped on a frame and immersed in 130-140° C. sulfuric acid and the temperature was slowly raised up to 200° C. Successful sulfonation times were between 1.5 and 2 hours. The fibers were removed at discrete intervals and washed with tap water, dried in an oven at 60° C. and carbonized in an inert atmosphere at 1150° C. Although good mechanical properties of the carbon fibers were obtained in this method, an expensive gel-spun polymer fiber was utilized, and the sulfonation time was inadequate.

In Polymer Bulletin, 25, 405-412, 1991 and Journal of Materials Science, 25, 4216-4222, 1990 A. J. Pennings et al. converted a linear low-density polyethylene to carbon fiber by immersing fibers into room-temperature chlorosulfonic acid for 5-20 hours. This process would be prohibitively expensive from an industrial prospective due to the high cost of chlorosulfonic acid as well as the long reaction times.

In 2002, Leon y Leon (International SAMPE Technical Conference Series, 2002, Vol. 34, pages 506-519) described a process of sulfonating LLDPE fibers (d=0.94 g/mL) with warmed, concentrated $H_2SO_4$. A two-stage sulfonated system was also described, wherein "relative to the first stage, the second sulfonation stage involves: (a) longer residence time at a similar temperature (or a larger single-stage reactor at a single temperature); or (b) a slightly higher acid concentration at a higher temperature." See page 514. Specific times and temperatures were not disclosed. In this reference tensile properties of the resulting carbon fibers were determined differently than is convention. Cross-sectional areas used for tensile testing were "calculated from density (by pycnometry) and weight-per-unit-length measurements" (pg 516, Table 3-pg 517). However, ASTM method D4018 describes that diameters should be measured directly by microscopy. After adjusting the reported tensile properties using the microscopy-measured diameters (Table 2, pg 517) new values were determined as follows:

| Trial # | Est. diameters | Measured diameters | Reported Young's Modulus (GPa) | Reported Tensile Strength (GPa) | Adjusted Young's Modulus (GPa) | Adjusted Tensile Strength (GPa) | Strain (%) |
|---|---|---|---|---|---|---|---|
| 22 | 9-10 | 14.3 | 105 | 0.903 | 51 | 0.44 | 0.86 |
| 26 | 9-10 | 13.2 | n.d. | 1.54 | n.d. | 0.89 | NA |
| 27 | 9-10 | 14.0 | 134 | 1.34 | 68 | 0.68 | 1.0 |

The methods disclosed in this reference produce carbon fibers having inadequate tensile strength and modulus.

In spite of these efforts, adequate methods of converting polyolefin based polymer fibers to adequate carbon fiber with fast sulfonation times are still needed. Thus, disclosed herein are methods of making carbon fibers from polymer fibers, the methods comprising the sulfonation of the polymer fiber, subsequent hot solvent treatment of the sulfonated fibers, followed by carbonization of the fibers. These methods result in industrial grade carbon fibers having superior properties, when compared to those that were not treated with a hot solvent. In addition, the methods disclosed herein are optionally rapid sulfonation processes, enabling an economical process to be realized.

In one aspect, disclosed herein are processes for preparing carbonized polymers, the processes comprising:

a) sulfonating a polymer with a sulfonating agent that is fuming sulfuric acid, sulfuric acid, chlorosulfonic acid, or a combination thereof to form a sulfonated polymer;

b) treating the sulfonated polymer with a heated solvent, wherein the temperature of the heated solvent is at least 95° C.; and c) carbonizing the resulting product by heating it to a temperature of 500-3000° C.

The compounds and processes disclosed herein utilize polymeric starting materials. The polymeric starting materials may be in the form of fabrics, sheets, fibers, or combinations thereof. In a preferred embodiment, the polymeric starting material is in the form of a fiber and the resulting carbonized polymer is a carbon fiber.

In another aspect, disclosed herein are carbon fibers made according to the aforementioned processes.

BRIEF DESCRIPTION OF THE DRAWINGS

FIG. 1 is a table summarizing data for various control and experimental carbon fibers.

DETAILED DESCRIPTION

Figure 2:
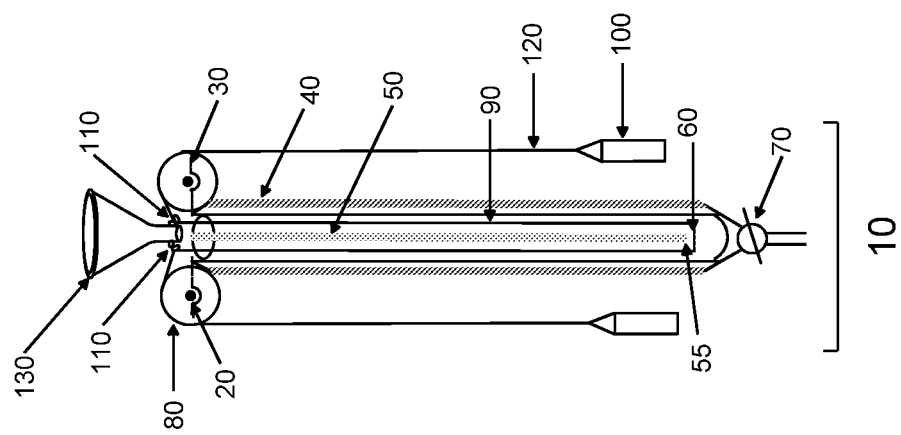
FIG. 2 is a drawing of a reactor that may be used in a batch method of making carbonized polymers, such as carbon fibers.

As mentioned above, the sulfonating agent comprises fuming sulfuric acid, concentrated sulfuric acid, chlorosulfonic acid, or a combination thereof.

In one embodiment the sulfonating agent comprises chlorosulfonic acid.

In one embodiment the sulfonating agent comprises concentrated sulfuric acid, which is commercially available and is typically 96+% sulfuric acid.

In another, more preferred embodiment, the sulfonating agents comprises fuming sulfuric acid. As used herein, fuming sulfuric acid (also referred to as "oleum") differs from concentrated sulfuric acid, in that fuming sulfuric acid is 100% sulfuric acid that contains dissolved $SO_3$. Typically, the concentration of the fuming sulfuric acid is described as the wt % free $SO_3$ in solution. There are several commercially grades of fuming sulfuric acid available, including, for example, ~15-30% and ~60-70% $SO_3$. Preferred fuming sulfuric acids are 0.1-30% fuming sulfuric acid. In the sulfonation reaction, fuming sulfuric acid is preferred to concentrated sulfuric acid as it is significantly more reactive and as a result, the sulfonation reaction occurs more quickly.

The reaction temperature for the oleum sulfonation reaction is typically from 0° C. to 140° C. Cooler reaction temperatures may be used, but then the kinetics of the sulfonation slow significantly, and the costs go up. More preferably, the reaction temperature is from 30-120° C. Yet still more preferably, the temperature is 35-120° C. Still more preferably, 45-120° C.

The sulfonation reaction typically takes 5 minutes to 12 hours to complete. Of course, it is known in the art that the sulfonation reaction time is affected by the fiber diameter (if a fiber is being used), % crystallinity of the polymer, concentration of double bonds in the polymer, porosity of the polymer, the sulfonation temperature, and the concentration of the oleum. The optimization of sulfonation temperature, concentration, and reaction time are within the ability of one having skill in the art.

The sulfonation reaction is normally run at ambient/atmospheric pressure. But if desired, pressures greater or lesser than ambient pressure may be used.

One method of decreasing sulfonation reaction time is to swell the polymer with suitable solvent before or during the sulfonation reaction. In one embodiment, a polymer could be treated with a suitable swelling solvent prior to treatment with an $SO_3$ solution of halogenated solvent. Alternatively, the polymer could be swelled with suitable solvent during the sulfonation step with an emulsion, solution, or otherwise combination of swelling agent and sulfonating agent. An additional benefit of performing a swelling step or steps before or during sulfonation is a more uniform sulfur distribution across the polymer and consequently enhanced processing conditions and properties.

After the polymer is sulfonated (or partially sulfonated), it is treated with a heated solvent. Acceptable temperatures are at least 95° C. More preferably, at least 100° C. Still more preferably at least 105° C. or 110° C. Even more preferably, at least 115° C. Most preferred is at least 120° C. The maximum temperature is the boiling point of the solvent or 180° C. In one embodiment, the temperature of the solvent is 100-180° C. Alternatively, the temperature of the solvent is 120-180° C. While temperatures below 120° C. can be used, the reaction rate is slower and thus, less economical as the throughput of the reaction decreases.

In one embodiment, the preferred solvents are polar and/or protic. Examples of protic solvents include mineral acids, water, and steam. $H_2SO_4$ is a preferred protic solvent. In one embodiment, the heated solvent is $H_2SO_4$ at a temperature of 100-180° C. Still more preferably, the heated solvent is $H_2SO_4$ at a temperature of 120-160° C.

Alternatively, the heated solvent may be a polar solvent. Examples of suitable polar solvents include DMSO, DMF, NMP, halogenated solvents of suitable boiling point or combinations thereof. Preferably, the heated solvent is a polar solvent at a temperature of 120-160° C.

It should be understood that when polymer fibers are being used, the nature of the polymer fibers, their diameter, tow size, and the % crystallinity of the fibers will impact the reaction conditions that are used. Likewise, the temperature of the heated solvent used in the heated solvent treatment and the concentration of the $H_2SO_4$ (if $H_2SO_4$ is used) also depends on the nature of the polymer fibers, their diameter, tow size, and the % crystallinity of the fibers.

Once the sulfonation reaction is completed (which means 1%-100% of the polymer was sulfonated) the fibers are optionally washed with one or more solvents. It is possible to determine the completion of the sulfonation reaction using thermogravimetric analysis (TGA), Suitable washing conditions encompasses rinsing, spraying, submerging or otherwise contacting the fibers with a solvent or combination of solvents. Preferred solvents include water, $C_1$-$C_4$ alcohols, acetone, dilute acid (such as sulfuric acid), halogenated solvents and combinations thereof. In one embodiment, the fibers are washed with water and then acetone. In another embodiment, the fibers are washed with a mixture of water and acetone. In still another embodiment, the fibers are washed with water, dilute sulfuric acid, or both. Once the fibers are washed, they may be blotted dry, air dried, heated using a heat source (such as a conventional oven, a microwave oven, or by blowing heated gas or gases onto the fibers), or combinations thereof.

The polymers used herein consist of homopolymers made from polyethylene, polypropylene, polystyrene, and polybutadiene, or comprise a copolymer of ethylene, propylene, styrene and/or butadiene. Preferred copolymers include ethylene/octene copolymers, ethylene/hexene copolymers, ethylene/butene copolymers, ethylene/propylene copolymers, ethylene/styrene copolymers, ethylene/butadiene copolymers, propylene/octene copolymers, propylene/hexene copolymers, propylene/butene copolymers, propylene/styrene copolymers, propylene butadiene copolymers, styrene/octene copolymers, styrene/hexene copolymers, styrene/butene copolymers, styrene/propylene copolymers, styrene/butadiene copolymers, butadiene/octene copolymers, butadiene/hexene copolymers, butadiene/butene copolymers, butadiene/propylene copolymers, butadiene/styrene copolymers, or a combination of two or more thereof. Homopolymers of ethylene and copolymers comprising ethylene are preferred.

It must be emphasized that the wash with a heated solvent is vital to the inventions disclosed herein. As shown below, the heated solvent treatment significantly improves the physical properties of the resulting carbon fiber, when compared to carbon fibers that were not treated with a heated solvent. Without wishing to be bound to a particular theory, it is believed that the heated solvent treatment allows the fibers to undergo crosslinking, which improves their physical properties, while inhibiting the ability of the fibers to fuse or undergo inter-fiber bonding.

And as previously mentioned, in some embodiments, the sulfonation reaction is not run to completion. Rather, after the reaction is 1-99% complete (or more preferably 40-99% complete), the sulfonation reaction is stopped and then the sulfonation is completed in the hot solvent treatment step (when the hot solvent is a mineral acid, such as concentrated sulfuric acid.)

Without wishing to be bound by a particular theory, it is believed that the sulfonic acid groups within sulfonated polyethylene polymers undergo a thermal reaction at ca. 145° C. (onset occurring around 120-130° C.) evolving $SO_2$ and $H_2O$ as products while generating new carbon-carbon bonds within the polymer. This was verified using Near-Edge X-Ray Absorption Fine Structure (NEXAFS) spectroscopy, which showed that heating sulfonated polyethylene fibers results in a decrease in C=C bonds and an increase in C—C single bonds. The addition of solvent separates the individual filaments and prevents fiber fusion. See the scheme below, which illustrates the generic chemical transformation occurring during the entire process. It should be understood by one skilled in the art that the variety and complexity of other functional groups present at all steps and have been omitted here for the sake of clarity. Additionally, it should be understood by one skilled in the art that the advent of inter-chain cross-linking reactions can occur at lower temperatures than that illustrated in the scheme.

Scheme 1. The generic chemical process of a hydrocarbon reacting with $SO_3$ generating a highly conjugated polymer with sulfonic acid groups, a subsequent thermal step cross-linking the individual polymer chains, and dehydrogenation at elevated temperatures resulting in the desired carbonized polymer.

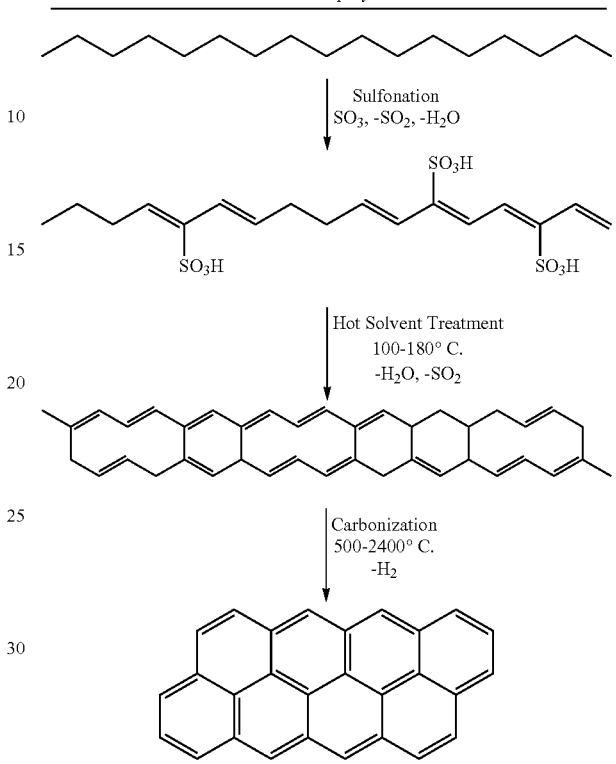

It must be emphasized that simply heating sulfonated fibers in an oven resulted in a high degree of fiber-fusion, wherein different fibers fuse or otherwise aggregate; such fused fibers tend to be very brittle and to have poor mechanical properties. In contrast, the treatment of sulfonated polymer fibers with a heated solvent results in fibers having significantly less fiber-fusion. Such fibers have improved tensile strength and higher elongation-to-break (strain) values. It is believed that the role of the solvent is to minimize the inter-fiber hydrogen bonding interactions between the surface sulfonic acid groups which thereby prevents inter-fiber cross-linking and fiber-fusion during the hot solvent treatment step. An alternative hypothesis employs the heated solvent to remove low molecular weight sulfonated polymer from the polymer fibers. Without removing this inter-fiber byproduct (i.e., the low molecular weight sulfonated polymer), heat treatment imparts similar cross-linking and ultimately creates the fusion of fibers.

It is possible that the sulfonation reaction will not go to completion, which (as is known in the art), results in hollow fibers, when fibers are used as the starting material. In such cases, (and as mentioned above) using hot sulfuric acid in the hot solvent treatment will continue the sulfonation reaction and drive it towards completion, while the thermal reaction is also occurring. In one embodiment of this invention, one could produce hollow carbon fibers from this process by reducing the amount of time in the sulfonation chamber, the hot sulfuric acid bath, or both, while still retaining the advantage of producing non-fused fibers. If desired, adjusting the relative amounts of sulfonation performed in the sulfonation reaction and the hot solvent treatment can be used to alter the physical properties of the resulting carbon fibers.

If desired, the sulfonation, the treatment with a heated solvent and/or the carbonization may be performed when the polymer is under tension. The following discussion is based on the use of a polymer fiber (also called "tow"). It is known in the carbon fiber art that maintaining tension helps to control the shrinkage of the fiber. It has also been suggested that minimizing shrinkage during the sulfonation reaction increases the modulus of the resulting carbon fiber.

When using oleum to perform the sulfonation reaction, it was discovered that the polymer fiber could be kept under a tension of 0-60 MPa, (with tensions of 0-35.5 or 0-16.8 MPa being preferred) the treatment with a heated solvent could be conducted while the polymer fiber was under a tension of 0-25 MPa, and carbonization could be conducted while the polymer fiber was under a tension of 0-14 MPa (with tensions of 0-8.8 or 0-5.3 MPa being preferred). In one embodiment, the process was conducted wherein at least one of the three aforementioned steps was conducted under tension. In a more preferred embodiment, the sulfonation, the treatment with a heated solvent, and the carbonization are performed while the polymer fiber is under a tension greater than 1 MPa. As will be readily appreciated, it is possible to run the different steps at different tensions. Thus, in one embodiment, the tension during the carbonization step differs from that in the sulfonation step. It should also be understood that the tensions for each step also depend on the nature of the polymer and the size and tenacity of the polymer fiber. Thus, as will be appreciated by one of skill in the art, the above tensions are guidelines that may change as the nature and size of the fibers change.

The carbonization step is performed by heating the sulfonated and heat treated fibers. Typically, the fiber is passed through a tube oven at temperatures of from 500-3000° C. More preferably, the carbonization temperature is at least 600° C. In one embodiment, the carbonization reaction is performed at temperature in the range of 700-1,500° C. The carbonization step may be performed in a tube oven in an atmosphere of inert gas or in a vacuum. One of skill in the art will appreciate that if desired, activated carbon fibers may be prepared using the methods disclosed herein.

In one preferred embodiment, the processes comprise:

sulfonating polyethylene containing polymer with fuming sulfuric acid, wherein the sulfonation reaction is performed at a temperature of from 35-140° C. to form a sulfonated polymer;

treating the sulfonated polymer with a protic solvent, wherein the temperature of the protic solvent is 100-180° C.; and carbonizing the resulting product by heating it to a temperature of 500-3,000° C.;

wherein at least one of steps a), b) and c) is performed while the polymer is under tension.

In this preferred embodiment, the protic solvent is a mineral acid, and/or the polyethylene containing polymer fibers are polyethylene homopolymers or polyethylene copolymers that comprise an ethylene/octene copolymers, ethylene/hexene copolymers, ethylene/butene copolymers, ethylene/propylene copolymers, ethylene/styrene copolymers, ethylene/butadiene copolymers, a mixture of one or more homopolymers and one or more polyethylene copolymers, or a combination of two or more polyethylene homopolymers, and/or the protic solvent is concentrated sulfuric acid at a temperature of 115-160° C., and/or wherein steps a), b) and c) are performed while the polymer (preferably a polymer fiber) are under a tension greater than 1 MPa.

Also disclosed herein are carbon fibers made according to any of the aforementioned process.

With regards to the process of sulfonating the fibers, it is possible to use either a batch or continuous method. An example of an apparatus used to perform the batch method may be seen in FIG. 2, wherein the reaction vessel 10 is similar in shape to a glass burette, but with an optionally removable glass rod 50 located in the space defined by the inside walls of the vessel 10. Glass rod 50 has a notched mounting bracket 30, wherein the bracket 30 is removably or permanently attached to the top end 53 of the glass rod 50. Wheel 80 fits into the notched mounting bracket 30 via an axis shaft 20. The glass rod 50 and attached mounting bracket 30 and related parts are located at the top of the reaction vessel 10. When the glass rod 50 is in place, the inside of the vessel 10 is open to the atmosphere. At the distal end 55 of the glass rod 50 there is a non-reactive material 60 (such as PTFE or other fluorinated hydrocarbon) that serves as a guide for the polymer fiber 90. The reaction vessel 10 is heated via heating element 40 which may be a jacket with recirculated heating fluid, a heating tape or any other heating method known in the art.

The polymer fiber 90 is guided down one side of the glass rod 50, around the non-reactive end 60, and back up the other side of the glass rod 50. Both ends of the polymer fiber 90 are tied or otherwise attached to a carbon fiber or wire (or any other flexible, fiber or wire that does not react with oleum) tow 120 with knot 110. The carbon fiber tow 120 is guided over the top of the wheel 80. Tension is then placed on the fiber 90 by addition of one or more weights 100 to carbon fiber tow 120. Addition of liquid (such as oleum) (the liquid is not shown) is achieved by pouring liquids directly into top with optional funnel 130. Other means for adding a liquid include pumping the sulfonating agent into the vessel 10 via valve 70. The liquid fills the inside of the vessel 10 and the polymer fiber 90 is immersed in the liquid. The polymer fiber 90 is maintained in the liquid for the desired reaction time and at the desired temperature. If desired, the liquid can be discarded from the reaction vessel via valve 70.

Figure 3:
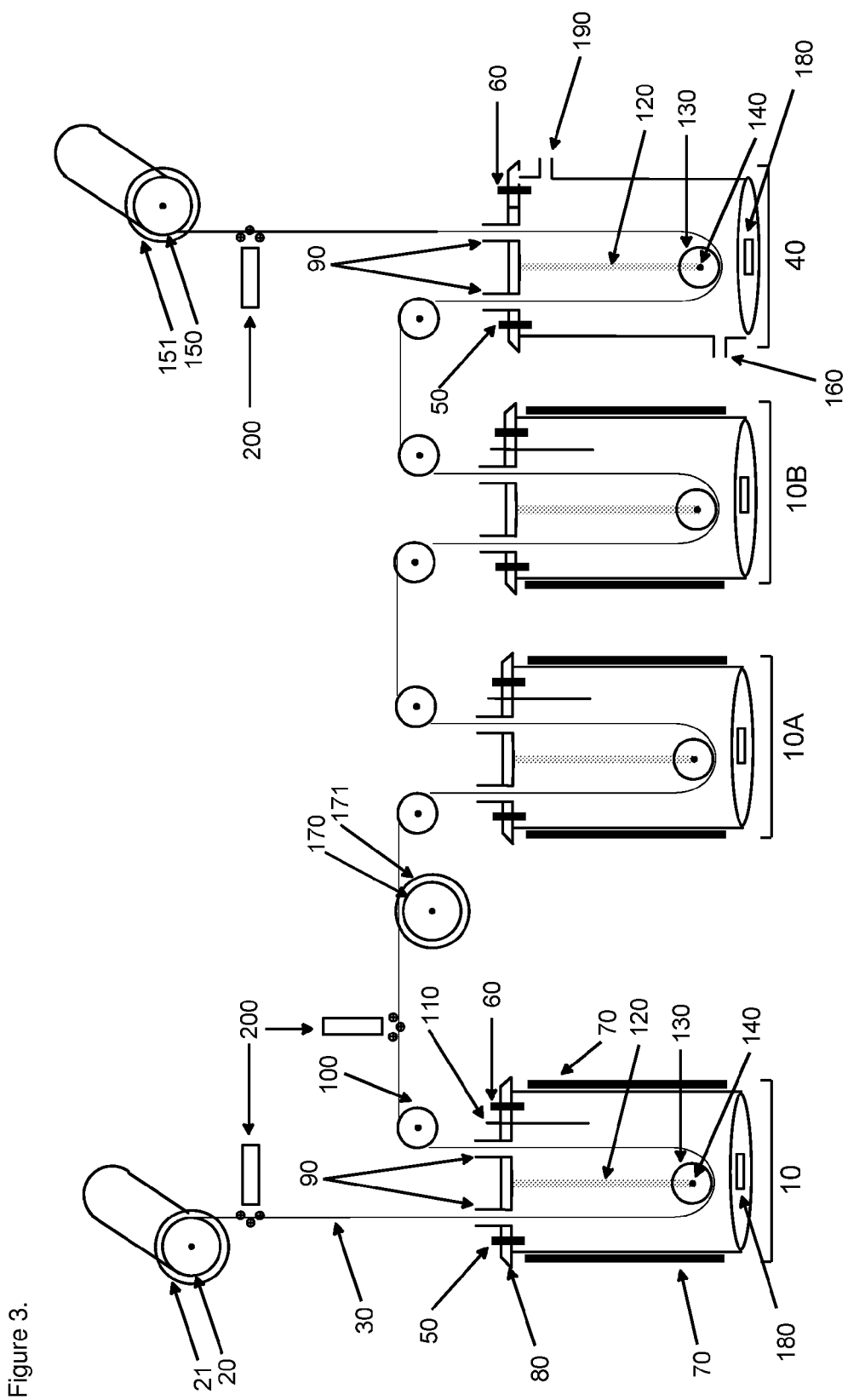
FIG. 3 is a drawing of a reactor that may be used in a continuous method of making carbonized polymers, such as carbon fibers.

An example of an apparatus that may be used to perform the continuous sulfonation method may be seen in FIG. 3. In FIG. 3, the reaction vessel 10 is in combination with one or more additional reaction vessels (10A and 10B) and with final washing vessel 40, wherein a polymer fiber 30 is fed from fiber spool 21 located on creel 20 through vessel 10, then vessels 10A and 10B, and finally, though vessel 40 to spool 151 located on creel 150. It will be understood that additional vessels or fewer vessels may be used and that each vessels independently may be used to conduct a reaction (such as a sulfonation reaction) or to wash the fiber (with a solvent). Each vessel 10 or 40 defines an enclosed space that is capable of holding a liquid and is typically cylindrical in shape. Each vessel also is designed to allow the entrance and exit of the polymer fiber 30 as it travels from creel 20 to creel 150.

Vessels 10, 10A, 10B and 40 are equipped with a lid 80 that is secured to the top of the vessel. Among other uses, lid 80 prevents foreign materials from falling into the reaction vessels, and allows for the contents to be placed under inert atmosphere. Located on the lid 80 are fiber pass-throughs 90, inert gas inlet 50 and outlet 60, and thermocouple 110. On the bottom side of the lid 80 there are two non-reactive shafts 120, wherein in FIG. 3, one shaft 120 is directly behind the other shaft 120 and consequently, cannot be seen in this drawing. It should be noted that it is possible to design a continuous reaction vessel 10 that has more than two non-reactive shafts 120 and thus, can accommodate more than two polymer fibers 30 at a time. The shafts are removably or permanently attached to the lid 80. The shafts are preferably glass-impregnated PTFE or a similar, non-reactive material. At the distal end of the shafts 120 is a wheel 130, which is attached to the end of the shafts 120 by an axis 140. Axis 140 is designed to accept and guide a polymer fiber 30. All wetted components (110, 120, 130, 140, and 180) are made from non-reactive materials such as PTFE, glass, or high quality stainless steel. Inside each of reaction vessels 10, 10A, 10B and 40 is a non-reactive magnetic stir bar 180 (made of materials such as PTFE) that sits at the bottom and is used to mix the contents of the vessel. As is known in the art, other mixing methods may also be used in replacement of or in combination with stir bar 180. The reaction vessels 10, 10A, 10B and 40 may be heated via heating element 70, which may be a jacket with recirculated heating fluid, a heating tape or any other heating method known in the art.

Polymer fiber 30 is fed from a fiber spool 21 located on creel 20 and ultimately ends on the take-up spool 151 located on creel 150. Optionally, multiple additional creels 170 can be used between reaction vessels 10, 10A, etc. to provide different tensions and/or shrinkages of the polymer fibers between the reaction vessels 10, 10A, etc. Structurally, washing vessel 40 is similar to reaction vessels 10, 10A, etc., except that it has water inlet 160 and outlet 190. Water, a non-aqueous solvent or a combination thereof is provided at a known rate into washing vessel 40 via a pump (not shown).

Creels 20, 150, and 170 can be either tension-controlled or speed-controlled. If creels 20, 150, 170 are speed-controlled shrinkage is directly controlled. In the current examples, creel 20 is a constant speed motor while creel 170 and 150 are constant tension creels. In this embodiment, the tension on the fiber is directly controlled and recorded using tension meters 200.

To perform the continuous sulfonation of polymer fiber, the reaction vessels 10, 10A and 10B are filled with desired sulfonation liquid, protic solvent, and/or polar solvent and heated (if desired) to the desired temperatures. Different vessels, 10, 10A, etc., and 40 may be at the same or different temperatures. The polymer fiber 30 is fed continuously from fiber spool 21 off creel 20 at a known speed. Polymer fiber 30 then enters reaction vessel 10 through pass-through 90 and into the optionally heated liquid (not shown), where the fiber 30 is submerged in the heated liquid. The fiber then is directed around the wheel 130 and out of the reaction vessel 10 via a different pass-through 90. Upon exiting the first reactor 10 the fiber 30 is redirected via wheel 100 (or any other means known in the art) through optional tension meter 200, onto a spool 171 located on creel 170 (which allows for separate tensions to be applied between vessel 10 and 10A, 10B and 40), and finally redirected around wheel 100 into the second reaction vessel 10A. The aforementioned process of 1) entering a reaction vessel 10, 2) being submerged in an optionally heated sulfonation liquid, protic solvent, and/or polar solvent, 3) being directed around the wheel 130, and out of the reaction vessel 10 via a different pass-through 90, is repeated as many times as deemed necessary. Upon exiting the last reaction vessel 10B the fiber 30 is directed via wheel 100 into washing vessel 40 where the polymer fiber 30 is immersed in fresh water. Deionized water is preferred, but non-deionized water will also work, as will other solvents, such as alcohols. Upon exiting the washing vessel 40 the fiber 30 is collected on the creel 150 where it remains until ultimately removed for subsequent carbonization experiments.

As previously mentioned, it is possible to use more (or fewer) than the three vessels, 10, 10A, and 10B shown in FIG. 3. For example, a continuous reactor utilizing five vessels, 10, 10A, 10B, 10C, and 40 could be used. In such a system, vessel 10 could contain a solvent used to swell the polymer fibers 30, 10A could contain a sulfonating reagent (such as 20% oleum), 10B could contain a hot solvent wash (such as 96% $H_2SO_4$), 10C could contain a second hot solvent wash (such as 96% $H_2SO_4$), and 40 would contain a washing solvent (such as water). As will be appreciated by those of skill in the art, it is possible to alter the order of the various vessels or to add/remove one or more vessels. Alternatively, two or more of vessels 10A, 10B, and 10C could contain a washing solvent, such as water, and alcohol, or a combination thereof.

In the following examples, tensile properties (young's modulus, tensile strength, % strain (% elongation at break)) for single filaments (fibers) were determined using a dual column Instron model 5965 following procedures described in ASTM method C1557. Fiber diameters were determined with both optical microscopy and laser diffraction before fracture.

Example 1: Comparative Example

A copolymer of ethylene and 0.33 mol % 1-octene (1.3 weight %) having $M_w$=58,800 g/mol and $M_w/M_n$=2.5 was melt-spun into a continuous tow of filaments. The filaments had diameter of 15-16 microns, a tenacity of 2 g/denier, and crystallinity of ~57%. A 1 meter sample of 3300 filaments was tied through the glass apparatus and placed under 200 g tension (~3 MPa). The fibers were then treated with 20% fuming sulfuric acid at 75° C. for 2.5 hr. The fibers were then removed and washed with 50% sulfuric acid and de-ionized water. The sulfonated fiber tow was then placed into a tube furnace under 100 g (~1.6 MPa) tension and heated to 1150° C. over 5 hr under nitrogen. Individual filaments from this tow were tensile tested. The average of 15 filaments provided a Young's Modulus 41.7 GPa, Tensile Strength 0.45 GPa, Elongation-to-break 1.06%, and diameter of 17.3 microns. SEM images of the carbon fibers show inter-fiber fusion, leading to defects on the surface of fibers that could be separated for tensile testing.

Example 2

The same fiber and reactor was used as in Example 1. A 1 meter sample of 3300 filaments was tied through the glass apparatus and placed under 400 g tension (~7 MPa). The fibers were then treated with 20% fuming sulfuric acid at 50° C. for 1 hr, followed by 96% sulfuric acid at 98° C. for 2 hr and then heated in the same acid to 120° C. for 4 hr. The fibers were then removed and washed with 50% sulfuric acid and de-ionized water. The sulfonated fiber tow was then placed into a tube furnace under 100 g (~2 MPa) tension and heated to 1150° C. over 5 hr under nitrogen. Individual filaments from this tow were tensile tested. The average of 15 filaments provided a Young's Modulus 68 GPa, Tensile Strength 1.08 GPa, Elongation-to-break 1.57%, and diameter of 12.9 microns.

Example 3

The same sulfonated fiber produced in Example 2 was placed into a tube furnace under 200 g (~3 MPa) tension and heated to 1150° C. over 5 hr under nitrogen. Individual filaments from this tow were tensile tested. The average of 15 filaments provided a Young's Modulus 62 GPa, Tensile Strength 1.08 GPa, Elongation-to-break 1.74%, and diameter of 13.2 microns.

Example 4

The same fiber and reactor was used as in Example 1. A 1 meter sample of 3300 filaments was tied through the glass apparatus and placed under 400 g tension (~7 MPa). The fibers were then treated with 20% fuming sulfuric acid at 50° C. for 1 hr. The tension was then changed to 200 g (~3.5 MPa) and the fiber was treated with 96% sulfuric acid at 98° C. for 2 hr and then heated in the same acid to 120° C. for 4 hr. The fibers were then removed and washed with 50% sulfuric acid and de-ionized water. The sulfonated fiber tow was then placed into a tube furnace under 100 g (~2 MPa) tension and heated to 1150° C. over 5 hr under nitrogen. Individual filaments from this tow were tensile tested. The average of 15 filaments provided a Young's Modulus 65 GPa, Tensile Strength 1.05 GPa, Elongation-to-break 1.60%, and diameter of 12.5 microns.

Example 5

The same sulfonated fiber produced in Example 4 was placed into a tube furnace under 200 g (~3.5 MPa) tension and heated to 1150° C. over 5 hr under nitrogen. Individual filaments from this tow were tensile tested. The average of 15 filaments provided a Young's Modulus 55 GPa, Tensile Strength 0.86 GPa, Elongation-to-break 1.60%, and diameter of 14.0 microns.

Example 6

The same fiber and reactor was used as in Example 1. A 1 meter sample of 3300 filaments was tied through the glass apparatus and placed under 600 g tension (~10 MPa). The fibers were then treated with 20% fuming sulfuric acid at 50° C. for 1 hr. The tension was then changed to 200 g (~3 MPa) and the fiber was treated with 96% sulfuric acid at 98° C. for 2 hr and then heated in the same acid to 120° C. for 4 hr. The fibers were then removed and washed with 50% sulfuric acid and de-ionized water. The sulfonated fiber tow was then placed into a tube furnace under 100 g (~2 MPa) tension and heated to 1150° C. over 5 hr under nitrogen. Individual filaments from this tow were tensile tested. The average of 15 filaments provided a Young's Modulus 71 GPa, Tensile Strength 1.00 GPa, Elongation-to-break 1.40%, and diameter of 13.0 microns.

Example 7

A copolymer of ethylene and 3.6 mol % 1-butene (7 weight %) having $M_w$=60,500 g/mol and $M_w/M_n$=2.7 was melt-spun into a continuous tow of filaments. The filaments had diameter of ~16 microns, a tenacity of ~1.8 g/denier, and crystallinity of ~45%. A 1 meter sample of 3300 filaments was tied through the glass apparatus and placed under 400 g tension (~6 MPa). The fibers were then treated with 20% fuming sulfuric acid at 75° C. for 30 minutes, followed by 96% sulfuric acid at 118° C. for ~16 hr. The fibers were then removed and washed with 50% sulfuric acid and de-ionized water. The sulfonated fiber tow was then placed into a tube furnace under 1000 g (~15 MPa) tension and heated to 1000° C. over 5 hr under nitrogen. Individual filaments from this tow were tensile tested. The average of 15 filaments provided a Young's Modulus 64 GPa, Tensile Strength 0.96 GPa, Elongation-to-break 1.50%, and diameter of 15.7 microns.

Example 8

A copolymer of ethylene and 3.6 mol % 1-octene (11.1 weight %) having $M_w$=116,260 g/mol and $M_w/M_n$=4.7 was melt-spun into a continuous tow of filaments. The filaments had diameter of ~15 microns, a tenacity of 5.5 g/denier, and crystallinity of ~40%. A spool containing 1088 filaments was fed through the continuous sulfonation apparatus (described in FIG. 3) and placed under 350 g tension (~18 MPa) in the first reactor and 100 g tension (~5 MPa) in the subsequent reactors. The first reactor contained 20% fuming sulfuric acid at 50° C., the second had 96% sulfuric acid at 100° C., and the third had 96% sulfuric acid at 120° C. The final washing reactor was supplied a continuous flow of de-ionized water and was at room temperature. The polyethylene fibers were fed continuously through the series of reactors at a constant feed rate, the residence time in each reactor was ~60 minutes (excluding shrinkage). Upon completion the fiber tows were un-spooled and samples were placed into a tube furnace under 50 g (~2.5 MPa) tension and heated to 1150° C. over 5 hr under nitrogen. Individual filaments from this tow were tensile tested. The average of 15 filaments provided a Young's Modulus 48 GPa, Tensile Strength 0.58 GPa, Elongation-to-break 1.19% and diameter of 16.7 microns.

Example 9

In the same experiment as Example 8, the third reactor bath was heated to 130° C. containing the same 96% acid. Upon completion the fiber tows were un-spooled and samples were placed into a tube furnace under 50 g (~2.5 MPa) tension and heated to 1150° C. over 5 hr under nitrogen. Individual filaments from this tow were tensile tested. The average of 15 filaments provided a Young's Modulus 48 GPa, Tensile Strength 0.85 GPa, Elongation-to-break 1.77%, and diameter of 17.0 microns.

Example 10

In the same experiment as Example 8, the third reactor bath was heated to 160° C. containing the same 96% acid. Upon completion the fiber tows were un-spooled and samples were placed into a tube furnace under 50 g (~2.5 MPa) tension and heated to 1150° C. over 5 hr under nitrogen. Individual filaments from this tow were tensile tested. The average of 15 filaments provided a Young's Modulus 43 GPa, Tensile Strength 0.76 GPa, Elongation-to-break 1.77%, and diameter of 15.1 microns.

Examples 11-14

A copolymer of ethylene and 0.33 mol % 1-octene (1.3 weight %) having $M_w$=58,800 g/mol and $M_w/M_n$=2.5 was melt-spun into a continuous tow of filaments. The filaments had diameter of ~11.3 microns, a tenacity of 3.9 g/denier, and crystallinity of ~55%. A spool containing 1753 filaments was fed through the continuous sulfonation apparatus and placed under 191 g tension (~10.5 MPa) in the first reactor and 110 g tension (~6 MPa) in the subsequent reactors. The first reactor contained 6% fuming sulfuric acid at 90° C., the second had 1% fuming sulfuric acid at 120° C., and the third had 96% sulfuric acid at 140° C. The final washing reactor was supplied a continuous flow of de-ionized water and was at room temperature. The polyethylene fibers were fed continuously through the series of reactors at a constant feed rate, the residence time in each reactor was ~15 minutes (excluding shrinkage). Upon completion, the fiber tows were un-spooled and the sulfonated fibers were passed through a tube furnace containing a nitrogen atmosphere at 1150° C. with 2.8 MPa tension. The residence time in the hot zone was 14 min. Following this low temperature carbonization, subsequent higher temperature carbonizations were performed with a separate tube furnace containing nitrogen atmosphere at temperatures up to 2400° C. with 2.8 MPa tension. The residence time in this hot zone was 2.2 min. Individual filaments from each tow were tensile tested. The average properties of 15 filaments are given in Table 1.

TABLE 1

Examples 11-14

| Example | Carbonization Temperature (° C.) | Strength (GPa) | Modulus (GPa) | % Elongation to Break | Diameter (microns) |
|---|---|---|---|---|---|
| 11 | 1150 | 1.08 | 60 | 1.80 | 10.9 |
| 12 | 1800 | 1.07 | 78 | 1.37 | 10.3 |
| 13 | 2200 | 1.15 | 109 | 1.06 | 10.2 |
| 14 | 2400 | 1.14 | 125 | 0.90 | 10.2 |

Examples 15-19

A copolymer of ethylene and 0.91 mol % 1-octene (3.5 weight %) having $M_w$=44,115 g/mol and $M_w/M_n$=3.5 was melt-spun into a continuous tow of filaments. The filaments had diameter of ~10.6 microns, a tenacity of 3.63 g/denier, and crystallinity of ~47%. A spool containing 1500 filaments was fed through the continuous sulfonation apparatus and placed under 245 g tension (~18 MPa) in the first reactor and 150 g tension (~11 MPa) in the subsequent reactors. The first reactor contained 6% fuming sulfuric acid at 100° C., the second had 1% fuming sulfuric acid at 120° C., and the third had 96% sulfuric acid at 140° C. The final washing reactor was supplied a continuous flow of de-ionized water and was at room temperature. The polyethylene fibers were fed continuously through the series of reactors at a constant feed rate, the residence time in each reactor was ~10 minutes (excluding shrinkage). Upon completion, the fiber tows were un-spooled and the sulfonated fibers were passed through a tube furnace containing a nitrogen atmosphere at 1150° C. with 3.7 MPa tension. The residence time in the hot zone was 14 min. min. Following this low temperature carbonization, subsequent higher temperature carbonizations were performed with a separate tube furnace containing nitrogen atmosphere at temperatures up to 2400° C. with 3.7 MPa tension. The residence time in this hot zone was 2.2 min. Individual filaments from each tow were tensile tested. The average of 15 filaments provided the results given in Table 2.

TABLE 2

Examples 15-19

| Example | Carbonization Temperature (° C.) | Strength (GPa) | Modulus (GPa) | % Elongation to Break | Diameter (microns) |
|---|---|---|---|---|---|
| 15 | 1150 | 0.86 | 49 | 1.70 | 11.1 |
| 16 | 1600 | 0.74 | 55 | 1.31 | 10.8 |
| 17 | 1800 | 0.61 | 54 | 1.09 | 11.5 |
| 18 | 2000 | 0.70 | 93 | 0.75 | 10.0 |
| 19 | 2200 | 1.14 | 193 | 0.62 | 9.5 |

Examples 20-23

A copolymer of ethylene and 0.91 mol % 1-octene (3.5 weight %) having $M_w$=44,115 g/mol and $M_w/M_n$=3.5 was melt-spun into a continuous tow of filaments. The filaments had diameter of ~10.1 microns, a tenacity of 3.9 g/denier, and crystallinity of ~47%. A spool containing 1753 filaments was fed through the continuous sulfonation apparatus and placed under 227 g tension (~15.8 MPa) in the first reactor and 127 g tension (~8.8 MPa) in the subsequent reactors. The first reactor contained 6% fuming sulfuric acid at 110° C., the second had 1% fuming sulfuric acid at 120° C., and the third had 96% sulfuric acid at 140° C. The final washing reactor was supplied a continuous flow of de-ionized water and was at room temperature. The polyethylene fibers were fed continuously through the series of reactors at a constant feed rate, the residence time in each reactor was ~10 minutes (excluding shrinkage). Upon completion, the fiber tows were un-spooled and the sulfonated fibers were passed through a tube furnace containing a nitrogen atmosphere at 1150° C. with 3.5 MPa tension. The residence time in the hot zone was 14 min. min. Following this low temperature carbonization, subsequent higher temperature carbonizations were performed with a separate tube furnace containing nitrogen atmosphere at temperatures up to 2400° C. with 3.5 MPa tension. The residence time in this hot zone was 2.2 min. Individual filaments from each tow were tensile tested. The average of 15 filaments provided the results given in Table 3.

TABLE 3

Examples 20-23

| Example | Carbonization Temperature (° C.) | Strength (GPa) | Modulus (GPa) | % Elongation to Break | Diameter (microns) |
|---|---|---|---|---|---|
| 20 | 1150 | 0.77 | 54 | 1.38 | 10.6 |
| 21 | 1800 | 0.70 | 65 | 1.01 | 10.4 |
| 22 | 2200 | 1.05 | 126 | 0.85 | 9.6 |
| 23 | 2400 | 1.10 | 148 | 0.76 | 9.4 |

The above data demonstrates that fibers made using fuming sulfuric acid followed by a hot solvent wash (hot sulfuric acid) significantly improves the physical properties of the resulting carbon fibers, when compared to fibers made using only fuming sulfuric acid.

Advantages of the oleum/hot solvent wash methods include faster reaction times when compared to concentrated sulfuric acid. For example, using a more concentrated oleum, such as 60% oleum for the sulfonation reaction proceeds even more quickly than the 20% oleum, which proceeds more quickly than concentrated sulfuric acid. Faster reaction times increase throughput rates, which increases cost efficiencies. Similarly, higher sulfonation temperatures have a similar effect.

Other advantages are based on the heated solvent treatment, which results in carbon fibers that have 1) increased elongation to break values when compared to fibers made using methods that do not utilize a heated solvent treatment, 2) higher modulus when compared to fibers made using methods that do not utilize a heated solvent treatment, and 3) which are not (or are less than 5%) fiber-fused or aggregated. These results were surprising and unexpected.

In examples 8, 9, and 10, it is demonstrated that increasing the temperature of the hot solvent treatment (in the above cases, concentrated sulfuric acid) causes a decrease in the modulus. But, it also increases both the strength and the elongation %. However, increasing the temperature too much, i.e., from 130° C. to 160° C. caused a statistically significant decrease in both the modulus and the strength, but not the elongation percent. From this data, it is safe to conclude that there is an optimal temperature at which the solvent should be heated for the heated solvent treatment. Of course, the size of the fiber, its tenacity and its chemical makeup will impact what the optimal temperature is, as will the nature of the heated solvent (and if it is an acid, its concentration). But it is within the abilities of one skilled in the art to ascertain the best temperature and heated solvent concentration for a particular fiber.

Examples 11-23 demonstrate optimized methods for retaining good carbon fiber properties with a reduced sulfonation process time. The fuming sulfuric acid, and heated solvent bath temperatures and concentrations (concentrated sulfuric acid) were modified to achieve rapid stabilization. When compared to Comparative Example 1, the dramatic reduction in sulfonation time and improved properties of this process are self-evident.

What is claimed is:

1. Processes for preparing carbonized polymers, comprising
   a) treating a polymer in a first vessel with a solution comprising a sulfonating agent that is fuming sulfuric acid, -chlorosulfonic acid, or a combination thereof at a temperature below the boiling temperature of the sulfonating agent to form a sulfonated polymer, wherein the concentration of the sulfonating agent is from 0.1 to 30 percent;
   b) treating the sulfonated polymer in a second vessel with a heated solvent comprising sulfuric acid, wherein the temperature of the heated solvent is from 95° C. to 180° C.; and
   c) carbonizing the resulting product by heating it to a temperature of 500-3000° C.

2. Processes according to claim 1, wherein the sulfonating agent comprises chlorosulfonic acid.

3. Processes according to claim 1, wherein the sulfonating agent comprises fuming sulfuric acid.

4. Processes according to claim 3, wherein the fuming sulfuric acid is 0.1-70% fuming sulfuric acid.

5. Processes according to claim 1, wherein the polymer consists of polyethylene or comprises a copolymer of ethylene.

6. Processes according to claim 5, wherein the copolymer of ethylene is an ethylene/octene copolymer, an ethylene/hexene copolymer, an ethylene/butene copolymer, or a combination of two or more thereof.

7. Processes according to claim 1, wherein the heated solvent is at a temperature of at least 100° C.

8. Processes according to claim 1, wherein the heated solvent is sulfuric acid at 100-180° C.

9. Processes according to claim 1, wherein the sulfonation reaction is performed at a temperature of 0-140° C.

10. Processes according to claim 1, wherein the sulfonation is conducted while the polymer is a polymer fiber, and the polymer fiber is under a tension of 0-35.5 MPa, the treatment with a heated solvent is conducted while the polymer fiber under a tension of 0-25 MPa, or carbonization is conducted while the polymer fiber is under a tension of 0-8.8 MPa.

11. Processes according to claim 1, wherein the sulfonation, the treatment with a heated solvent, and the carbonization are performed while the polymer is under a tension greater than 1 MPa.

12. Processes according to claim 10, wherein the tension during the carbonization step differs from that in the sulfonation step.

13. Processes according to claim 1, wherein the carbonization step is performed at temperatures of from 700-1,500° C.

14. Processes according to claim 1, comprising:
   a) sulfonating a polyethylene containing polymer in a first vessel with fuming sulfuric acid, wherein the sulfonation reaction is performed at a temperature of from 35-140° C. to form a sulfonated polymer;
   b) treating the sulfonated polymer in a second vessel with a protic and/or polar solvent, wherein the temperature of the solvent is 100-180° C.; and
   c) carbonizing the resulting product by heating it to a temperature of 500-3000° C.;
wherein at least one of steps a), b) and c) is performed while the polymer fibers are under tension.

15. Processes according to claim 14, wherein the protic and/or polar solvent is a mineral acid.

16. Processes according to claim 14, wherein the polyethylene containing polymers are polyethylene homopolymers or polyethylene copolymers that comprise an ethylene/octene copolymers, ethylene/hexene copolymers, ethylene/butene copolymers, ethylene/propylene copolymers, ethylene/styrene copolymers, ethylene/butadiene copolymers, a mixture of one or more homopolymers and one or more polyethylene copolymers, or a combination of two or more polyethylene homopolymers.

17. Processes according to claim 14, wherein the protic and/or polar solvent is sulfuric acid at a temperature of 115-160° C.

18. Processes according to claim 14, wherein steps a), b) and c) are performed while the polymer is under a tension greater than 1 MPa.

19. Processes for preparing carbonized polymers, comprising
   a) treating a polymer in a first vessel with a sulfonating agent that is fuming sulfuric acid, -chlorosulfonic acid, or a combination thereof to form a sulfonated polymer;
   b) treating the sulfonated polymer in a second vessel with a heated solvent consisting of sulfuric acid, wherein the temperature of the heated solvent is at least 95° C.; and
   c) carbonizing the resulting product by heating it to a temperature of 500-3000° C.

* * * * *